US011238626B2

(12) United States Patent
Kellermann

(10) Patent No.: US 11,238,626 B2
(45) Date of Patent: Feb. 1, 2022

(54) METHOD FOR GENERATING A SERIES OF SECTIONS, METHOD FOR THREE-DIMENSIONAL RECONSTRUCTION OF A MICROSCOPIC SAMPLE, AND MICROTOME SYSTEM

(71) Applicant: Leica Mikrosysteme GmbH, Vienna (AT)

(72) Inventor: Peer Oliver Kellermann, Vienna (AT)

(73) Assignee: LEICA MIKROSYSTEME GMBH, Vienna (AT)

( * ) Notice: Subject to any disclaimer, the term of this patent is extended or adjusted under 35 U.S.C. 154(b) by 75 days.

(21) Appl. No.: 16/707,077

(22) Filed: Dec. 9, 2019

(65) Prior Publication Data

US 2020/0193653 A1 Jun. 18, 2020

(30) Foreign Application Priority Data

Dec. 14, 2018 (DE) ...................... 10 2018 132 227.5

(51) Int. Cl.
*G01N 1/28* (2006.01)
*G06T 7/00* (2017.01)
(Continued)

(52) U.S. Cl.
CPC ............ *G06T 11/003* (2013.01); *G01N 1/286* (2013.01); *G06T 7/0012* (2013.01); *G06T 7/292* (2017.01);
(Continued)

(58) Field of Classification Search
CPC ..... G06T 11/003; G06T 7/0012; G06T 7/292; G06T 7/55; G06T 2207/10061;
(Continued)

(56) References Cited

U.S. PATENT DOCUMENTS

2014/0026683 A1* 1/2014 Hayworth ................ G01N 1/06
73/863.01
2015/0264270 A1* 9/2015 Watanabe .............. G02B 21/24
348/79
(Continued)

FOREIGN PATENT DOCUMENTS

DE 102013106023 A1 12/2014

OTHER PUBLICATIONS

Horstmann, Heinz, et al., "Serial Section Scanning Electron Microscopy (S3EM) on Silicon Wafers for Ultra-Structural Volume Imaging of Cells and Tissues," PLoS ONE, www.plosone.org, Apr. 2012, vol. 7, Issue 4, e35172, pp. 1-6.
(Continued)

*Primary Examiner* — Jon Chang
(74) *Attorney, Agent, or Firm* — Hodgson Russ LLP

(57) ABSTRACT

A method is proposed for generating a series of sections of a microscopic sample (10), in which the sections are detached from the sample (10) by means of a blade (21), collected, and placed onto a transfer device. A sequence in which the sections are detached from the sample is detected; detachment of the sections from the sample (10) and/or collection of the sections and/or placement of the sections onto the transfer device is monitored by means of one or several observation cameras, accompanied by the acquisition of moving-image data; the sections are tracked in the moving-image data; and positions of the sections on the transfer device are correlated, on the basis of the tracking in the moving-image data, with the sequence in which they were detached from the sample. Also subjects of the present invention are a method for three-dimensional reconstruction of a microscope sample (10), in which sections of the sample (10) are microscopically investigated accompanied by acquisition of section image data and in which the section image data are assembled into a volume image; and a (Continued)

corresponding microtome system (100) having a microtome (110) and a data acquisition and evaluation unit (120), and having one or several observation cameras (30).

14 Claims, 4 Drawing Sheets

(51) Int. Cl.
    *G06T 7/292*      (2017.01)
    *G01N 1/06*      (2006.01)
    *G06T 11/00*      (2006.01)
    *G06T 7/55*      (2017.01)

(52) U.S. Cl.
    CPC .................. *G06T 7/55* (2017.01); *G01N 1/06* (2013.01); *G01N 2001/2873* (2013.01); *G06T 2207/10061* (2013.01)

(58) Field of Classification Search
    CPC .. G01N 1/286; G01N 2001/2873; G01N 1/06; G02B 21/008; G02B 21/365
    See application file for complete search history.

(56) References Cited

U.S. PATENT DOCUMENTS

2017/0003309 A1*    1/2017    Mitra ........................ G01N 1/06
2017/0160535 A1*    6/2017    Mitra ...................... G16B 20/00

OTHER PUBLICATIONS

Harris, Kristen M., et al., "Uniform Serial Sectioning for Transmission Electron Microscopy," The Journal of Neuroscience, Nov. 22, 2006, vol. 26(47), pp. 12101-12103.

* cited by examiner

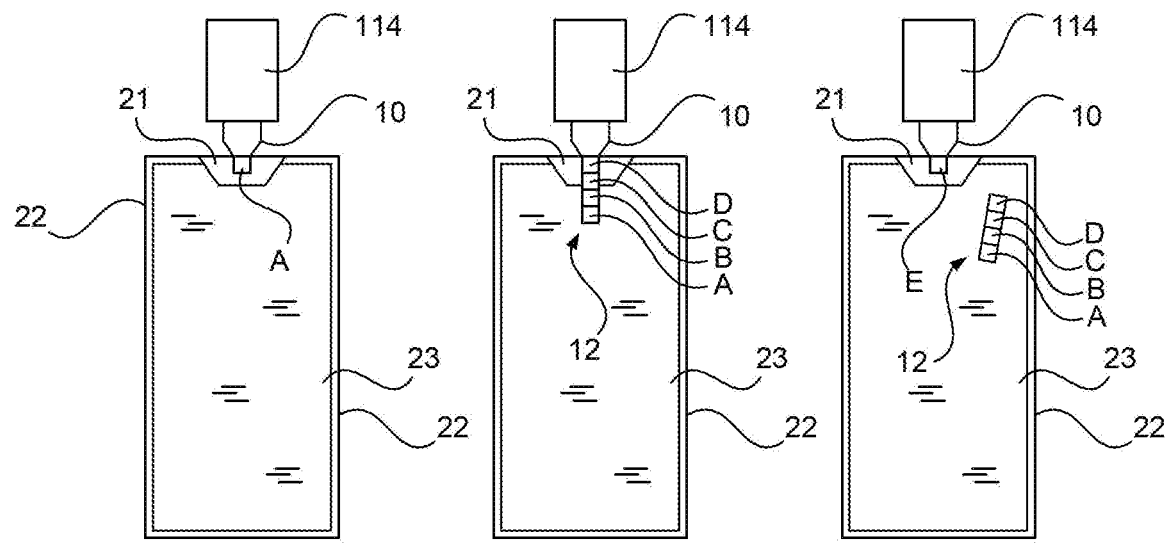
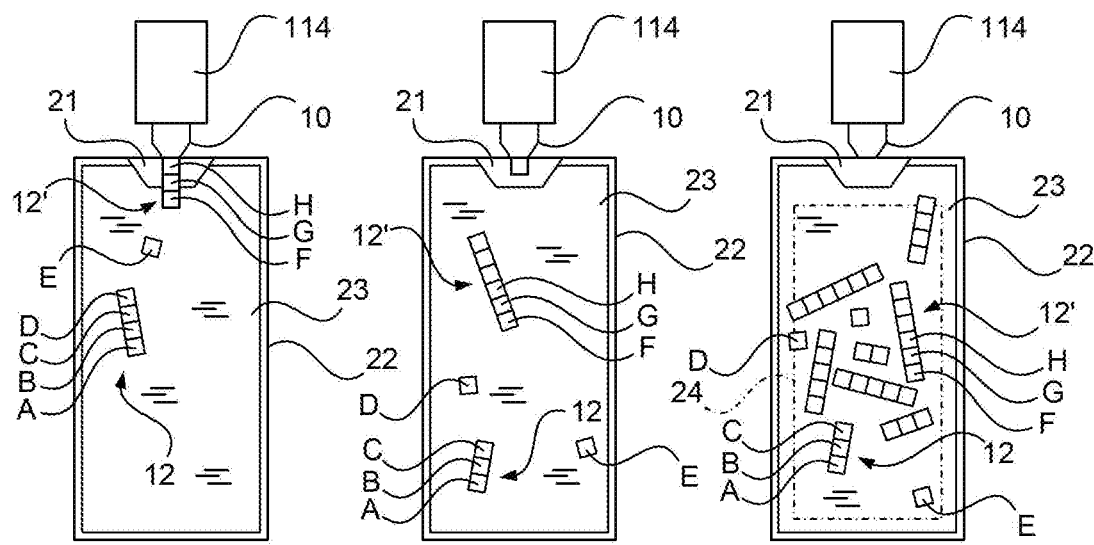

METHOD FOR GENERATING A SERIES OF SECTIONS, METHOD FOR THREE-DIMENSIONAL RECONSTRUCTION OF A MICROSCOPIC SAMPLE, AND MICROTOME SYSTEM

CROSS REFERENCE TO RELATED APPLICATIONS

This application claims priority of German patent application number 10 2018 132 227.5 filed Dec. 14, 2018, the entire disclosure of which is incorporated by reference herein.

FIELD

The present invention relates to a method for generating a series of sections of a microscopic sample, to a method for three-dimensional reconstruction of a microscopic sample from a series of sections, and to a microtome system, having the features of the independent claims.

BACKGROUND OF THE INVENTION

Investigation of series of sections, in particular by electron microscopy, and reconstruction of three-dimensional sample information from such series, are very important in particular in neuroscience but also in other fields of biology and medicine.

Corresponding methods comprise, inter alia, "serial section scanning electron microscopy" (ssSEM, $S^3$EM) and "serial section transmission electron microscopy" (ssTEM); the present invention can be utilized especially in conjunction with ssSEM. It is understood, however, that the principles explained below can also apply in particular to other methods of comparable types. In particular, the present invention can be used in principle in conjunction with light microscopy rather than electron microscopy, even though the explanations that follow concentrate on electron microscopy.

As described, for example, in Horstmann, H. et al., Serial Section Scanning Electron Microscopy ($S^3$EM) on Silicon Wafers for Ultra-Structural Volume Imaging of Cells and Tissues, PLoS ONE 7(4), 2012, e35172, by means of ssSEM it is possible to provide a high-resolution, three-dimensional (3D) depiction of cellular ultrastructure. In contrast to ssTEM (explained below), which permits an investigation of restricted sub-cellular volumes but by no means a complete ultrastructural reconstruction of large volumes, entire cells, or entire tissues, the latter is possible using ssSEM.

In ssSEM, serial sectioning of tissues is combined with scanning electron microscopy (SEM), in particular using a conductive wafer as a carrier. In ssSEM, section ribbons having hundreds of sections with a thickness of, for example, 35 nm are generated, and are imaged on the wafer with a lateral pixel resolution of, for example 3.7 nm. Back-scattered electrons can be recorded using the "in-lens" detector of the SEM. The images resulting from such a method are comparable in quality to those of a conventional TEM. The essential advantage of ssSEM is that comparatively large structures, for example in the range of tens to hundreds of cubic micrometers, can be reconstructed with it.

The more conventional ssTEM method is described, for example, in Harris, K. M. et al., Uniform Serial Sectioning for Transmission Electron Microscopy, J. Neurosci. 26(47), 2006, 12101-12103. ssTEM can also be superior to other methods for reconstructing three-dimensional sample information, such as confocal microscopy, in particular because of the high resolution.

A sample for ssSEM and ssTEM is prepared for processing in known fashion and embedded, for example, in agarose or in suitable plastics. Section ribbons, in which the individual sections adhere to one another, are produced from the embedded sample using an ultramicrotome, by setting a suitable advance rate. Corresponding section ribbons float in a liquid bath and are removed using suitable transfer devices ("slot grids" or, in the case of ssSEM, also wafers) for further investigation. It is also possible not to allow the resulting section ribbons to float on a liquid bath but instead to transfer them directly onto a suitable carrier, for example a wafer.

The location of an individual section in the specimen being investigated corresponds to its location in a section ribbon that has been generated, and vice versa. It is therefore very important, in corresponding methods, to generate section ribbons that are as long and uninterrupted as possible, thereby allowing the location of the individual sections in the sample as a whole to be described. As indicated in the technical literature cited, however, it is not always possible to ensure this, for example with certain embedding materials. For long section ribbons, correspondingly long liquid baths or receiving devices are necessary, and handling of the sections becomes difficult. The desired generation of multiple section ribbons also typically proves to be not unproblematic in practice, and requires skill and long experience.

One possibility for generating multiple section ribbons when a liquid bath is used is as follows: after a desired number of sections, the particular section ribbon that is adhering at that time is detached from the blade using a manipulation tool (typically an eyelash) and directed into a region of the liquid trough where it does not impede sectioning of the respective new ribbon. When a sufficient number of section ribbons has been generated in this manner, the transfer device that is being used is slowly lifted upward out of the liquid. The liquid flows off, and the sections adhere onto the transfer device. It is typically possible to generate up to approximately 200 sections in this fashion. If a liquid bath is not used, the explanations apply correspondingly.

As mentioned, one disadvantage of a corresponding method is that the sections of a section ribbon often do not reliably adhere to one another. For example, pieces of ribbon can therefore drift away from one another on the liquid surface, so that they can then no longer be associated with the section sequence. Bending of corresponding section ribbons is also often observed, causing impacts against surrounding structures or other ribbons. Tearing therefore often occurs, and in some cases the resulting fragments drift apart. If section ribbons or fragments thereof bump against the air/liquid interface when a liquid bath is used, they cannot, or cannot reliably, be placed onto the transfer device, but instead continue to adhere preferentially to the interface. Sections can thus become lost. A further disadvantage is the fact that in the manner described, only a small proportion of the transfer device can be occupied. That occupancy rate is typically at most 10%, so that frequent transfers are necessary in such methods. Manipulations using the manipulation tool are also risky, since the ribbons and sections can be damaged. In particular, detachment and/or perforation or folding can occur.

One alternative is to form parallel section ribbons that each adhere to the blade. Up to 300 sections can be generated in this fashion. It is necessary in this connection, however, to bring the sections of interest into a position that is at a certain distance from the blade. This is done by using so-called "release" sections whose only purpose is to extend the section ribbons and thus shift the sections of interest into the region of the transfer device; but they consume sample material. The release sections themselves are lost for actual investigation. Because of the interposed release sections, it is not possible to generate continuous sections over larger sample regions, since the series of sections of interest are repeatedly interrupted by the release sections that are required for positioning and are absent when investigation subsequently occurs.

It is also known to generate individual sections rather than section ribbons, and to fish those sections successively out of a liquid bath using a conveyor belt before they can respectively drift away. The conveyor belt is embodied here to be essentially endless, and the sequencing of the sections on the belt corresponds to the section sequence. A corresponding method entails a high level of manual effort, however. The conveyor belt must typically be cut to size manually and secured on large silicon wafers for transfer into the microscope. Here as well, a low occupancy rate of the silicon wafers with sections, and thus a high material consumption, are unavoidable. Setup of the equipment is time-consuming, the corresponding equipment is expensive, and the conveyor belt material may be difficult to obtain.

In light of the above, the object of the present invention is to describe improved capabilities for producing section series which are suitable for three-dimensional reconstruction of a corresponding sample.

DISCLOSURE OF THE INVENTION

In light of the above, the present invention proposes a method for generating a series of sections of a microscopic sample, a method for three-dimensional reconstruction of a microscopic sample, and a microtome system, having the features of the independent claims. Advantageous embodiments are the subject of the dependent claims and of the description that follows.

Advantages of the Invention

In the method proposed according to the present invention for generating a series of sections of a microscopic sample, the sections, as is known in this regard, are detached from the sample by means of a suitable blade, collected, and then placed onto a transfer device. Corresponding methods have already been explained in detail above. The present invention can be utilized in conjunction with light-microscopy methods and corresponding microtomes, but in particular also in conjunction with electron-microscopy methods and ultramicrotomes. In the latter case, so-called semi-thin sections or ultra-thin sections are generated. In general, the sections generated in the context of the present invention can have any thicknesses that can be generated using corresponding apparatuses. For example, the sections generated with a diamond knife utilizing a liquid bath typically have thicknesses from approximately 10 nm to 300 nm. These section thicknesses, and in particular section thicknesses from approximately 10 to 100 nm or from approximately 10 nm to 50 nm, can be used In the context of ssSEM as mentioned earlier. When a "section" is mentioned hereinafter, it is therefore assumed that microscopic sections of all typical section thicknesses for the purpose recited are encompassed.

The present invention relates in particular to the generation of sections for methods in which the sections are detected in microscopic image-producing fashion, and in which a reconstruction of three-dimensional data (volume image data) from the correspondingly detected sections is accomplished. As mentioned, for this task it is particularly necessary to generate uninterrupted section series and to associate the respective sections with the sequence in which they were detached from the sample and thus with the position in the volume image data. The present invention makes this possible by detecting moving-image data (video data) and by tracking the generated sections in the moving-image data. It is thus possible, despite drifting motions, disintegration of section ribbons, and the like, always to reliably associate the individual sections in terms of their location in the overall specimen or in a corresponding volume image. It is known that successive sections are often very similar, and that any other association is therefore almost impossible.

In principle, various devices can be utilized in the context of the present invention in order to collect the samples that have been generated. As mentioned, the use of liquid baths is known in particular in this connection, the sections being collected on a corresponding liquid surface. A typical liquid is (deionized) water. In principle, however, the sections can also be collected on a solid carrier or on its surface. The explanations that follow refer, merely in the interest of clarity, to collection of the samples on a liquid surface, but relate similarly to other possibilities.

In the context of the present invention, for this purpose a sequence in which the sections are detached from the sample is detected, and detachment of the sections from the sample and/or collection of the sections and/or placement of the sections onto the transfer device is monitored by means of one or several observation cameras, accompanied by the acquisition of moving-image data. Preferably, all three aforesaid steps are monitored in the manner explained. The observation cameras that are used can be configured for a variety of observation modalities, for example for observation in the visual spectrum or in the infrared. An "observation camera" is understood in the context of the present invention as any camera that makes it possible to detect in planar fashion, in particular, a surface on which the sections are collected. A corresponding observation is, however, also configured, for example, to monitor the blade of the microtome being used, and in that context to correspondingly identify and subsequently track each section as it is generated. If necessary, refocusing can occur, or several observation cameras focused on different planes can be used.

In the context of the present invention, the sections are then each tracked in the moving-image data, and positions of the sections on the transfer device are respectively correlated, on the basis of their tracking in the moving-image data, with the sequence in which they were detached from the sample. It is thereby possible to localize the respective sections on the transfer device in accordance with the sequence of their detachment from the sample. As already mentioned, this allows an association of the respective sections on the transfer device with their position in the sectioned sample or with images in a volume image.

In the case of ssSEM, the transfer device can in particular be a silicon wafer that serves for investigation in a scanning electron microscope, or any other transfer device that is configured for investigating a corresponding sample in a microscopic investigation system or for transferring it thereinto. In the case of ssTEM, in particular, a known grid can be used. On a corresponding transfer device the sections are, in particular, processed using suitable contrasting methods, for example by vapor-coating or infiltration with dyes or heavy-metal salts. Corresponding contrasting can, however, also have been already performed previously, before the sample is subjected to the method according to the present invention.

In the context of the present invention, the entire transfer device having the individual sections can be microscopically investigated, and the respective sections can be associated, based on their prior tracking and position determination, with a volume image that is to be generated.

In the context of the present invention, detachment of at least some of the sections from the sample can comprise the generation of section ribbons, as has been explained previously in principle. The sections can then at least in part be collected in the form of those section ribbons, for example on a liquid surface. Because the sample sections are tracked in the moving-image data that are generated, these section ribbons can likewise each be correspondingly associated. In contrast to the known methods explained earlier, it is not necessary in this context to deposit the section ribbons in a defined sequence, for example, on a transfer device. The section ribbons can also be generated with a variable section-ribbon length, so that the complex generation of section ribbons of maximum length is no longer necessary and the problems associated therewith can be avoided. In particular, it is thereby possible to prevent bending and breaking of overly long section ribbons. In addition, disintegration of the section ribbons, which occurs more or less often depending on the sample, is no longer an issue thanks to the tracking of the sections.

Considerably denser packing of corresponding sections on the transfer device can be effected in the context of the present invention than in the existing art. This can be achieved, for example, by the fact that the number of sections in a corresponding section ribbon or in several corresponding section ribbons is adapted in order to achieve a maximally dense section-ribbon cluster or section-ribbon packing in a region of the transfer device and previously, for example, on a liquid surface.

In other words, in the context of the present invention the section ribbons can at least in part be generated with a predefined number of sections or with a number of sections in a predefined range of numerical values, the number of sections of the section ribbons being predefined in particular on the basis of a target density of the sections, for example on a liquid surface. In this connection an observation of the cutting operation can be effected, for example, continuously or at predetermined time intervals, and whenever it is detected that the density of the sections exceeds an advantageous value, or a spacing of the sections falls below an advantageous value, for example when a visual observation is made that the sections are abutting against one another or are about to overlap one another, a change in sectioning position can be performed. The sections are thus thereby brought, in groups, to different positions. A corresponding target density can also be predefined, for example, in the form of a numerical value in an automated method, the numerical value being capable of being derived from empirical observations or from theoretical data. A change in sectioning position can then be effected whenever the predefined numerical value is exceeded.

An interruption in a section ribbon can be brought about, for example, by the fact that an advance rate of zero is set in a corresponding microtome. When new sections are then produced at the same location on a blade, for example a diamond blade, a section ribbon that is subsequently produced pushes the first one out in front of itself until the first one slews out to the side, becomes rotated, and is no longer in the way of the second one. This is the case in particular when a liquid surface is used to collect the sections. Particularly dense packing can thereby be achieved if large numbers of relatively short section ribbons are generated in this context. The optimum number of sections in the respective section ribbons can easily be ascertained empirically using "blank" sample material.

It can also happen, however, that the section ribbon that is being produced moves a very large number of section ribbons or section-ribbon fragments. If the resistance thus becomes too great, undesired folding of the sections can occur if they are thin. It can also happen that the section ribbons already present on the liquid surface are pushed out of a desired region by means of the section ribbons just generated.

A deliberate change in sectioning position can also be performed in the context of the present invention. This can be accomplished, for example, by sectioning at a different point on a stationary blade that is correlated with the respective collecting device, for example a liquid surface. A corresponding blade can have, for example, a width of 4 mm, the sample width being capable of being, for example, 0.1 mm. A large number of different position changes can thereby be made. The section cluster that is generated can thus be made even wider, and the area of a transfer device can be better utilized. A criterion for a corresponding change can be, for example, that the last section has caused the sections to move beyond a physical boundary on a liquid surface. That boundary can be selected in such a way that all the sections can be collected with the transfer device, and none of the sections abuts against the boundary. A change in sectioning positions can also be implemented, for example, on the basis of an excessively high shifting resistance, and when folds in the sections are observed. In other words, in the context of the present invention the sections can be applied, for collection, in groups at different positions on the liquid surface.

In the context of the present invention, tracking of the positions of the sections can comprise detection of a motion of the sections as they are detached from the sample and/or as they are collected, for example on a liquid surface, and/or as they are placed onto the transfer device. All the motion processes that conventionally would result in a loss of the association of the respective sections with their location in the sample can thereby be detected in the context of the present invention. Different tracking algorithms that are known in principle from the existing art can be used, for example, in the context of the present invention. The tracking algorithms can be based, for example, at least in part on the fact that a movie is recorded, and that the displacements of the sections between the acquisition of two movie images are so small that when the movie images are compared, the association is unequivocal based on the overlap. In this embodiment, image pairs that are close together in time are repeatedly compared so that the association of the respective sections with the location in the sample is retained. On the other hand, for example, individual features such as shapes, colors, or structures within the moving sections can also assist association for tracking purposes.

In the context of the present invention, in particular each of the sections is numbered upon detachment from the sample, tracking of the positions of the sections is carried out while maintaining their numbering, and the association between the positions of the sections on the transfer device and the sequence in which they were detached from the sample is made on the basis of the numbering. Particularly simple association can thereby be achieved. In particular, based on the tracking of the sections in the context of the present invention it is possible to create a location map of the sections, the sections being numbered in the location map in accordance with the sequence in which they were detached from the sample. The location map thus describes the location of the sections on the transfer device in accordance with their detachment sequence, and can be used for the aforementioned association. Numbering can occur in real time, i.e. a respective number can be associated with each section as or after it is generated, and each section can then be tracked using that number. Alternatively thereto, however, numbering can be performed only after the sectioning operation is completed, using the recorded moving-image data. In this case as well, tracking is possible using the respective number.

As mentioned, in the context of the present invention the sections can be used or generated as semi- or ultrathin sections, and a glass or diamond blade can be used as the blade. The blades can be part of corresponding blade units that can also comprise a trough for receiving a liquid that is used to constitute a liquid surface on which the sections can be collected.

The present invention also relates to a method for three-dimensional reconstruction of a microscopic sample, in which sections of the sample are microscopically investigated accompanied by acquisition of section image data, and in which the section image data are assembled into a volume image. This method is notable for the fact that the sections of the sample are generated by means of a method that has been explained above in the embodiments; and that a position of the section image data in the volume image is defined on the basis of the tracking of the positions of the sections in the moving-image data. With regard to features and advantages of a corresponding method and its advantageous embodiments, reference is expressly made to the explanations above, since they also relate to the method according to the present invention for three-dimensional sample reconstruction.

The microscopic investigation can comprise in particular an investigation using light microscopy or electron microscopy.

The present invention furthermore relates to a microtome system having a microtome and a data acquisition and evaluation unit, and having one or several observation cameras, the microtome being configured to generate a series of sections of a microscopic sample, and the generation of the series of sections comprising detaching the sections from the sample by means of a blade, collecting them, and then placing them onto a transfer device. The microtome system is notable for the fact that it is configured to detect a sequence in which the sections are detached from the sample, and further to monitor the detachment of the sections from the sample, and/or the collection of the sections, and/or the placement of the sections on the transfer device, accompanied by acquisition of moving-image data by means of the one or several observation cameras. It is further notable for the fact that it is configured to track positions of the sections in the moving-image data by means of the data acquisition and evaluation unit, and to correlate positions of the sections on the transfer device, on the basis of the tracking in the moving-image data, with the sequence of detachment from the sample.

As repeatedly mentioned, collection of the sections can occur in particular on a liquid surface but also on a solid surface.

The invention will be illustrated in further detail below with reference to the appended drawings, which illustrate embodiments of the invention.

BRIEF DESCRIPTION OF THE DRAWINGS

FIGS. 3A to 3F are highly simplified top views illustrating the generation of sections in accordance with an advantageous embodiment of the invention.

In the Figures, elements that correspond physically or functionally to one another are indicated with identical reference characters, and in the interest of clarity are not explained repeatedly.

DETAILED DESCRIPTION

Figure 1:
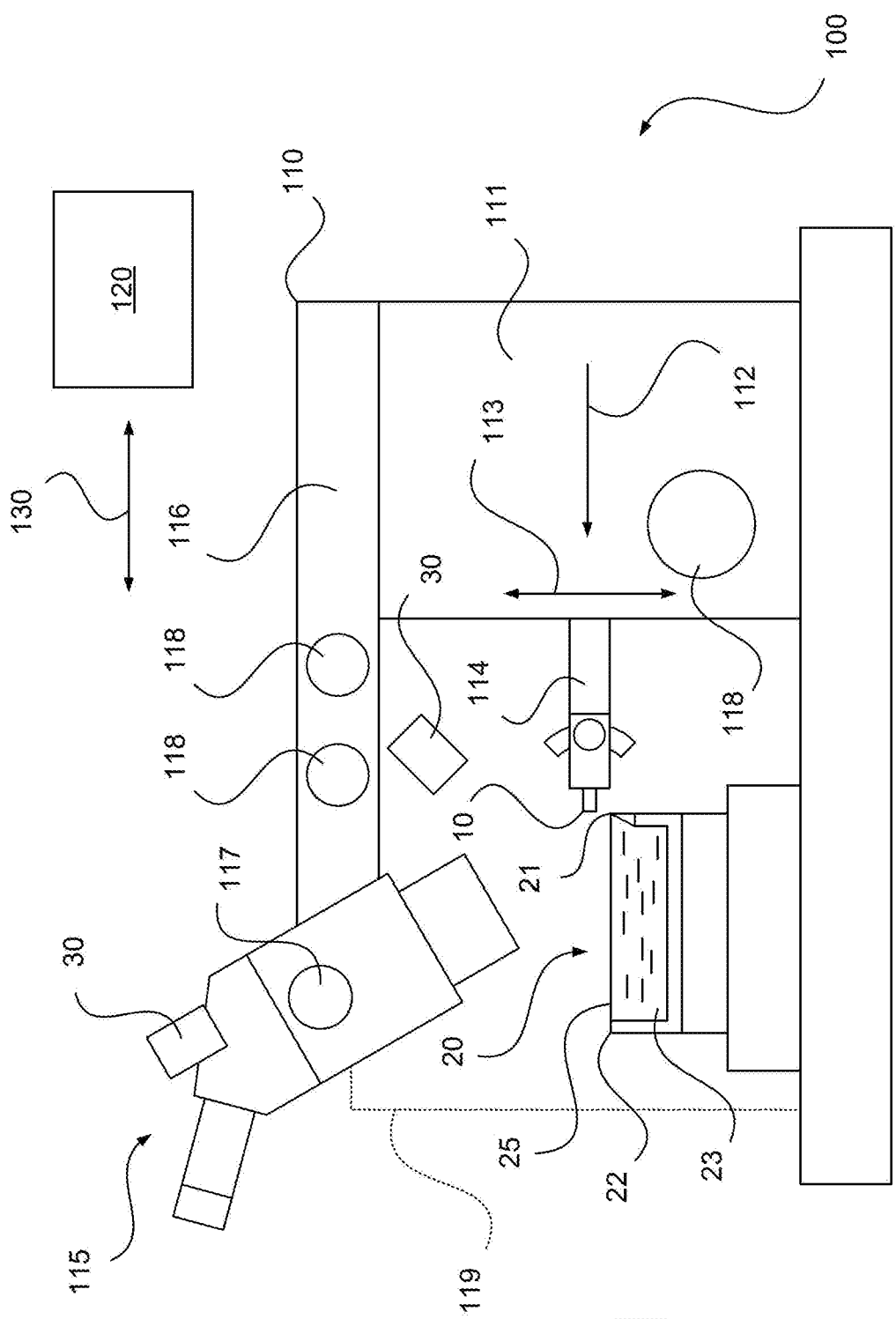
FIG. 1 is a highly simplified side view of a microtome system in accordance with an advantageous embodiment of the invention.

FIG. 1 is a highly simplified side view showing a microtome system in accordance with an embodiment of the invention. The microtome system as a whole is labeled 100.

In the example depicted, microtome system 100 comprises a microtome 110 that can be embodied in particular as an ultramicrotome. Also provided is a calculation and evaluation unit 120 that is connected to microtome 110 via a cable-based or wireless communication link 130. Divergently from what is depicted in FIG. 1, calculation and evaluation unit 120 can also be accommodated in microtome 110 or in a housing thereof, or in a personal computer system or workstation.

Microtome 110 comprises a sample holder 114 on which a sample 10 can be mounted and which, for the generation of sections, is advanceable by means of an advance unit 111 in the direction of an arrow 112 and is also movable up and down in the direction of arrow 113. As sample holder 114 moves up and down, sample 10 is guided past a blade 21, in particular a diamond blade, that is mounted on a blade unit 20 depicted in a greatly enlarged lateral section view, a thin section being generated in each case as a result of the advance. As will be explained in further detail with reference to the subsequent Figures, the sections thereby generated float in a liquid trough 22 of blade unit 20 on a suitable liquid 23 or on its liquid surface 25. Liquid surface 25 is flush with an upper edge of liquid trough 22, so that blade 21 is always wetted with liquid.

Let it be emphasized once again that in the context of the present invention, sections can also alternatively be collected on a solid surface rather than on liquid surface 25. What is used in this case is not a liquid trough 22 but instead a divergently embodied collecting device. The explanations below relate analogously to such an embodiment.

An observation microscope 115 is provided in order to check the sectioning operation. A camera having a monitor can also be provided instead of or in addition to an observation microscope 115. Observation microscope 115 is fastened on a carrier arm 116 of microtome 110. Observation microscope 115 comprises one or several control elements 117 for adjustment. Microtome 110 comprises several control elements 118 for adjusting sectioning parameters. One or several observation cameras 30, by means of which a detachment of sections from sample 10 and/or transfer thereof onto liquid surface 25 of liquid 23 and/or transfer thereof onto a transfer device (not illustrated here) can be monitored, as explained in detail above and hereinafter, can be installed on observation microscope 115 or at one or several other suitable positions. Observation cameras 30 can be connected for that purpose, in particular, to calculation and evaluation unit 120.

Microtome 110 can comprise a cold chamber 119, illustrated with dashed lines, and any further devices, for example illumination devices, temperature-control devices, and the like.

Figure 2:
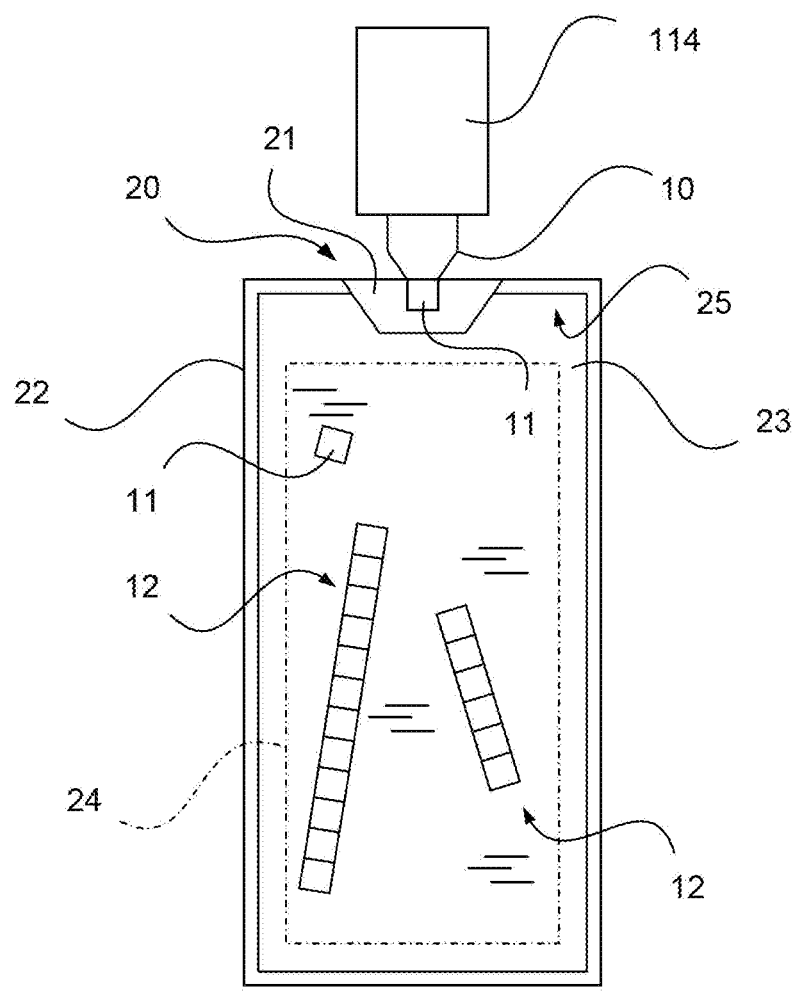
FIG. 2 is a highly simplified top view of a blade unit, usable in an advantageous embodiment of the invention, of a microtome system.

Blade unit 20, which is depicted in FIG. 1 in a schematic lateral section view, is shown in FIG. 2 in highly simplified fashion in a top view onto surface 25 of liquid 23 which lies parallel to the plane of the paper. Also illustrated is part of sample holder 114 with the preferably frustoconical sample 10 in place. As mentioned, blade 21 of a corresponding blade unit 20 can have a width of, for example, 4 mm, and the sample width can be, for example, 0.1 mm. The depiction in FIG. 2 and in the Figures that follow is therefore not to scale, and the sections are depicted greatly enlarged for illustrative purposes.

As a result of the aforementioned feed motion and the upward and downward motion of sample holder 114, sections 11 can be detached from sample 10 by means of blade 21 and placed onto liquid surface 25 of liquid 23. Depending on the sectioning parameters and materials that are used, sections 11 can be generated in the form of individual sections or as section ribbons 12 of identical or different length and, once they have been suitably detached from blade 21, rest freely on liquid 23 as a result of surface tension without dipping into it.

After generation of a sufficient number of sections 11 or section ribbons 12, in the course of which they can also be aligned and/or displaced, they can then be transferred onto a transfer device that is arranged below sections 11 or section ribbons 12 and is illustrated here with dashed lines and labeled as 24, by the fact that liquid surface 25 of liquid 23 is lowered. Any other relative motions between sections 11 or section ribbons 12, or liquid surface 25 and transfer device 24, are also possible in principle. Reference may be made to the explanations above regarding the disadvantages of methods of the existing art.

FIGS. 3A to 3F are highly simplified top views to illustrate the generation of sections in an advantageous embodiment of the invention; the elements shown correspond to the elements already explained with reference to FIG. 2. FIGS. 3A to 3F show "snapshots" during the generation of several sections 11 and section ribbons 12, using the same view as FIG. 2. For better comprehension of the sequence in which they are generated, the sections are correspondingly labeled here with capital letters. A depiction of transfer device 24, which can nevertheless also already be present or correspondingly arranged in corresponding steps, and individual labeling of the liquid surface, have been omitted in FIGS. 3A to 3E.

In FIG. 3A a first thin section A is being generated and is still adhering to blade 21. After several upward and downward motions of sample holder 114, a section ribbon 12 adhering to blade 21 has been generated by the production of sections B to D, which are connected to one another and to thin section A; this is illustrated in FIG. 3B.

Section ribbon 12 can be extended in any manner and then detached from blade 21, for example, by using an advance motion of zero or by means of a suitable manipulation tool. Section ribbon 12 having sections A to D is thereby transferred onto the liquid surface of liquid 23 and can drift away from blade 21, as illustrated in FIG. 3C.

In the context of the present invention, the sequence in which sections 11, or A to D constituting part of section ribbon 12, are detached, and/or their transfer onto the liquid surface of liquid 23, and/or their transfer onto transfer device 24, is monitored, accompanied by the acquisition of moving-image data, for example by means of observation camera(s) 30 shown in FIG. 1; and sections 11 or A to D are tracked in the moving-image data so that a position of sections 11 or A to D can be localized on the transfer device in accordance with the sequence in which they were generated. It is thereby possible, for example, to track the drift of section ribbon 12.

As shown in FIG. 3C, a further section E is also generated and can likewise be extended into a section ribbon or, as illustrated in FIG. 3D, can be intentionally or unintentionally detached individually from blade 21 and transferred onto the liquid surface of liquid 23. A corresponding drifting motion occurs here as well, section E now also being additionally tracked in the context of the present invention. As additionally illustrated in FIG. 3D, section ribbon 12 having sections A to D has now also drifted farther away. These sections A to D also continue to be tracked. In addition, a further section ribbon 12' having sections F to H is generated; here it is still adhering to blade 21 and, for example, is being further extended.

As shown in FIG. 3E, thin section D has detached from section ribbon 12 for whatever reason, and sections A to C and D have drifted further; as explained previously, however, sections A to C and section D can be individually tracked. The same applies here to section E that has also drifted further, and to the newly formed section ribbon 12' that has here been extended to include further sections that are not individually labeled.

In FIG. 3F it is assumed that the sectioning of sample 10 has ended. A large number of sections 11 or A to H and/or section ribbons 12, 12', not all of which are labeled with reference characters, are now present on the liquid surface of liquid 23. These can be placed on transfer device 24 in the manner that has been explained. Thanks to tracking in the moving-image data, the sequence in which sections 11 or A to H were produced is traceable despite differences in drifting motion.

It is understood that the depiction in FIG. 2 and FIGS. 3A to 3F is highly simplified and schematic. In particular, very much longer section ribbons 12, 12' having a very much larger number of sections 11 or A to H, and overall a very much larger number of section ribbons 12, 12' or sections 11 or A to H, can be generated; as mentioned, sections 11 or A to H can also typically be considerably smaller, in particular with reference to blade 21.

Figure 4:
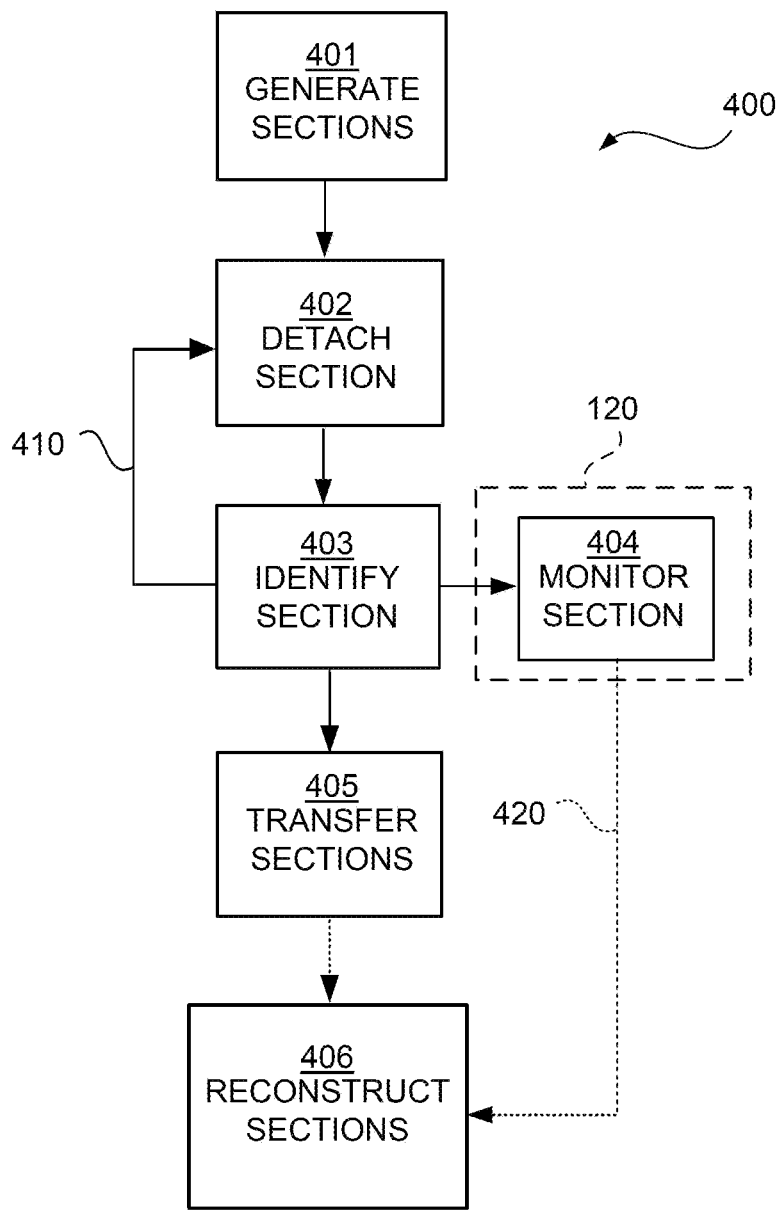
FIG. 4 is a schematic flow chart illustrating a method in accordance with an advantageous embodiment of the invention.

FIG. 4 illustrates a method in accordance with an advantageous embodiment of the invention, in the form of a schematic flow chart 400 having steps 401 to 406.

In step 401, generation of a series of sections is initiated. This can be the case, for example, when a new sample 10 is clamped into a sample holder 114 or has been trimmed to a region of interest. At the same time, in step 401 or thereafter, generation of moving-image data by one or several observation cameras 30 is begun.

The method continues with a step 402 in which a section 11 is detached from sample 10. In a step 403, this section 11 is identified in the continuously acquired moving-image data and henceforth monitored as a monitored object in calculation and evaluation unit 120. This is illustrated in the form of a step 404 in which a corresponding monitored object is added to a list of monitored objects.

As illustrated by an arrow 410, the method is carried out until a sufficient number of sections 11 has been generated. Further steps, for example for detaching individual sections and section ribbons 12, 12', can also be provided here.

When a sufficient number of sections 11 has been generated, in a step 405 they can be transferred onto a transfer device 24 in the manner explained. Thanks to the continuous tracking of sections 11, the sectioning sequence of sections 11, which may in the meantime have drifted, is known. Corresponding information can be used later in a 3D reconstruction step 406, as illustrated in the form of an arrow 420.

What is claimed is:

1. A method for generating a series of sections of a microscopic sample, the method comprising steps of:
    detaching the sections from the sample using a blade;
    detecting a sequence in which the sections are detached from the sample;
    collecting the sections;
    placing the sections onto a transfer device;
    monitoring the detachment of the sections, the collection of the sections, and/or the placement of the sections onto the transfer device, wherein the monitoring step is performed using at least one observation camera acquiring moving-image data;
    tracking positions of the sections in the moving-image data; and
    correlating the positions of the sections on the transfer device with the sequence in which they were detached from the sample based on the tracking of the positions of the sections in the moving-image data.

2. The method according to claim 1, wherein the samples are collected on a solid carrier or on a liquid surface.

3. The method according to claim 1, wherein the detachment of at least some of the sections from the sample includes generating section ribbons, and wherein the sections are collected at least in part in the form of such section ribbons.

4. The method according to claim 3, wherein the section ribbons are generated having a predefined number of sections or having a number of sections in a predefined range.

5. The method according to claim 4, wherein the number of sections of the section ribbons is predefined based on a target.

6. The method according to claim 1, wherein the sections are brought, in groups, to different positions for collection.

7. The method according to claim 1, wherein the tracking of the positions of the sections includes detecting a motion of the sections upon detachment from the sample and/or upon collection on the liquid surface and/or upon placement onto the transfer device.

8. The method according to claim 1, wherein the tracking of the positions of the sections is accomplished using at least one tracking algorithm.

9. The method according to claim 1, wherein each of the sections is numbered upon detachment from the sample in accordance with the sequence of detachment, the tracking of the positions of the sections is carried out while maintaining the numbering of the sections, and an association between the positions of the sections on the transfer device and the sequence in which they were detached from the sample is effected based on the numbering.

10. The method according to claim 1, further comprising the step of creating a location map of the sections based on the tracking of the positions of the sections, wherein the sections are numbered in the location map in accordance with the sequence in which the sections were detached from the sample.

11. The method according to claim 1, wherein the sections are generated as semi- or ultrathin sections, and the blade is a glass blade or a diamond blade.

12. A method for three-dimensional reconstruction of a microscopic sample, the method comprising steps of:
    detaching a series of sections from the sample using a blade;
    detecting a sequence in which the sections are detached from the sample;
    collecting the sections;
    placing the sections onto a transfer device;
    monitoring the detachment of the sections, the collection of the sections, and/or the placement of the sections onto the transfer device, wherein the monitoring step is performed using at least one observation camera acquiring moving-image data;
    tracking positions of the sections in the moving-image data; and
    correlating the positions of the sections on the transfer device with the sequence in which they were detached from the sample based on the tracking of the positions of the sections in the moving-image data;
    microscopically investigating the sections of the sample to acquire section image data; and
    assembling the section image data into a volume image, wherein a position of the section image data in the volume image is defined on the basis of the tracking of the positions of the sections in the moving-image data.

13. The method according to claim 12, wherein the step of microscopically investigating the sections comprises an investigation using light microscopy or electron microscopy.

14. A microtome system comprising:
    a microtome having a blade;
    a data acquisition and evaluation unit; and
    at least one observation camera;
    wherein the microtome is configured to generate a series of sections of a microscopic sample by detaching the sections from the sample using the blade, collecting the sections, and placing the sections onto a transfer device;
    wherein the microtome system is configured to detect a sequence in which the sections are detached from the sample;
    wherein the microtome system is further configured to monitor the detachment of the sections from the sample, and/or the collection of the sections, and/or the placement of the sections onto the transfer device, by using the at least one observation camera to acquire moving-image data; and
    wherein the data acquisition and evaluation unit is configured to track positions of the sections in the moving-image data and to correlate positions of the sections on the transfer device with the sequence of detachment from the sample based on the tracking of the positions of the sections in the moving-image data.

* * * * *